April 4, 1950 E. BURTON 2,502,822

ELECTRON TUBE COUPLING CIRCUIT

Filed Dec. 31, 1942 2 Sheets-Sheet 1

INVENTOR
E. T. BURTON
BY H. A. Burgess
ATTORNEY

April 4, 1950 E. BURTON 2,502,822

ELECTRON TUBE COUPLING CIRCUIT

Filed Dec. 31, 1942 2 Sheets-Sheet 2

INVENTOR
E. T. BURTON
BY H. A. Burgess
ATTORNEY

Patented Apr. 4, 1950

2,502,822

UNITED STATES PATENT OFFICE 2,502,822

ELECTRON TUBE COUPLING CIRCUIT

Everett T. Burton, Millburn, N. J., assignor to Bell Telephone Laboratories, Incorporated, New York, N. Y., a corporation of New York Application December 31, 1942, Serial No. 470,883

8 Claims. (Cl. 178—44)

This invention relates to wave translating apparatus, and more particularly to such apparatus for transferring electrical waves from an unbalanced circuit to a balanced circuit, or from a balanced circuit to an unbalanced circuit.

An unbalanced circuit is one in which one side is at a given polarity with respect to ground while the other side is ground per se. A balanced circuit is one whose two sides are at opposite polarities with respect to ground. Ground is commonly understood to include any steady potential accepted as a reference. Balanced or unbalanced circuits contemplate a range of different conditions extending between completely balanced and completely unbalanced.

The present invention involves electronic apparatus for translating voltages unbalanced to ground into voltages balanced to ground, and vice versa.

The main object of the invention is to transfer electrical waves from an unbalanced circuit to a balanced network.

Another object is to transfer electrical waves from an unbalanced circuit to an unbalanced network.

A further object is to transfer electrical waves from a balanced circuit to a balanced network.

Still another object is to transfer electrical waves from a balanced circuit to an unbalanced network.

In a specific embodiment the present invention interposed between unbalanced and balanced circuits comprises a pair of electronic tubes, each including a control grid, a cathode and an anode; and a voltage mixer individual to each of the electronic tubes. Both control grids are extended to the unbalanced circuit, while each anode is connected to a corresponding terminal of one of the voltage mixers and each cathode is applied to the opposite terminal of the voltage mixer to which the anode of the other electronic tube is connected. The mid-points of both voltage mixers are extended to the balanced circuit.

A feature of the invention is that its effective frequency range extends down to and including direct current. Another feature is that the two voltages to be transferred may originate in the same source or two different sources, and comprise the same frequency or different combinations of frequencies. In the latter connection voltage components of like frequency and phase tend to balance out while unlike voltage components (as to frequency) are effectively transferred between the unbalanced or balanced circuits. A further feature concerns the transfer of two voltages whose amplitudes are dissimilar in magnitude such that the amplitude dissimilarity is effectively transferred from one circuit to another circuit. Thus, in effect, the foregoing other and further features involve differential mixing as to frequency and amplitude, respectively.

The invention will be readily understood from the following description taken together with the accompanying drawing, in which.

In the drawing the same reference numerals are utilized to designate the same elements appearing in the several figures.

Figure 1:
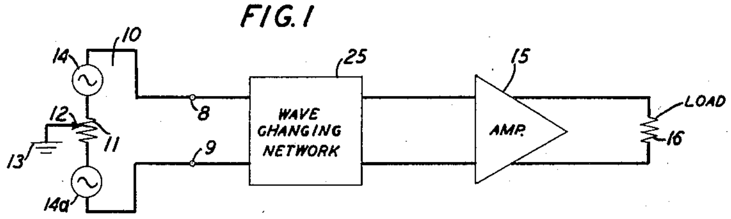
Fig. 1 is a box representation of a wave translating network interposed between an unbalanced circuit and a balanced circuit.
Figure 2:
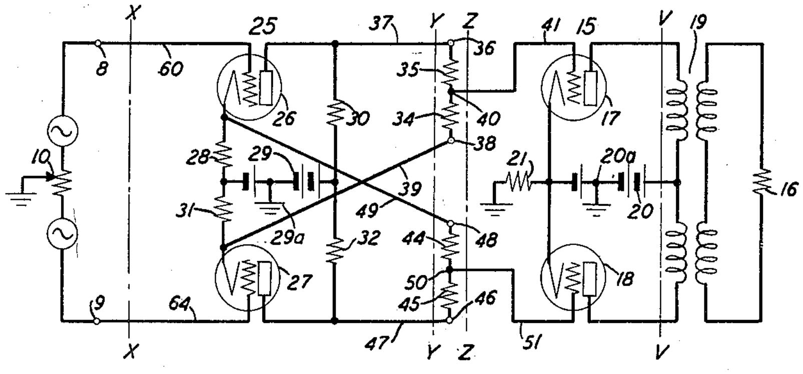
Fig. 2 is a diagrammatic circuit illustrating a specific embodiment of the invention involving the translating network of Fig. 1.

Referring to Fig. 1, an input circuit 10 comprises an impedance 11, an adjustable contact 12 slidable therealong and extended to ground point 13, and voltage sources 14 and 14*a* located at opposite terminals of the impedance 11. The adjustable contact 12 serves to apply effectively different portions of the impedance 11 to ground. Thus, the input circuit 10 may simulate an electrical voltage comprising two portions balanced or unbalanced to ground, and at a given instant provided with opposite signs. Obviously, the input circuit 10 may comprise any source in which the voltage is balanced and/or unbalanced to ground potential to any extent, and is so represented for the purpose of this illustration. The voltages present in the input circuit 10 and effective across terminals 8 and 9 are ultimately amplified in the electronic amplifier 15 and thereafter supplied to a load 16. Referring to Fig. 2, the electron amplifier 15 may comprise a pair of electron tubes 17 and 18 arranged in push-pull and having its output balanced to ground potential and applied through an output transformer 19 to the load 16. A source 20 of direct potential having a terminal 20a connected to a ground point serves to energize the anode-cathode circuits of both electron tubes 17 and 18, and through a resistor 21 to apply the same negative biasing potential to the control grids of both latter tubes. Thus, the amplifier tubes 17 and 18 are arranged to receive and amplify voltages having opposite polarities and balanced to ground potential.

In accordance with the present invention, the voltages present in the input circuit 10 are translated by the network 25, Fig. 1, into voltages balanced to ground potential which latter voltages are thereafter impressed on the input circuit of the amplifier 15. Referring to Fig. 2, the translating network 25 embodies a pair of electron tubes 26 and 27, each of which embodies a control grid, a cathode, and an anode and arranged to supply a relatively low amount of power. The control grids of the tubes 26 and 27 are extended to the input terminals 8 and 9, respectively. The anode-cathode circuit of the tube 26 serially embodies cathode resistor 28, source 29 of direct potential having a point 29a applied to ground point, and anode resistor 30. The anode-cathode circuit of the tube 27 serially includes cathode resistor 31, source 29, and anode resistor 32. The resistance value of the resistors 28, 30, 31 and 32 is of the same order of magnitude. The resistors 28 and 31 effectively apply equal magnitudes of negative biasing potential to the control grids of the tubes 26 and 27, respectively.

A pair of serially connected, equal resistors 34 and 35 has one outer terminal 36 extended over lead 37 to the anode of the tube 26 and an opposite outer terminal 38 applied over lead 39 to the cathode of the tube 27. A mid-point 40 of the serially connected resistors 34 and 35 is applied over lead 41 to the control grid of the tube 17. Thus, the serially connected resistors 34 and 35 together with the above-described connections thereto constitute effectively a voltage mixer. A pair of serially connected, equal resistors 44 and 45 has one outer terminal 46 extended over lead 47 to the anode of the tube 27 and an opposite terminal 48 applied over lead 49 to the cathode of the tube 26. A mid-point 50 of the serially connected resistors 44 and 45 is applied over lead 51 to the control grid of the tube 18. The resistance value of the resistors 34, 35, 44 and 45 is preferably of the same magnitude. Thus, the serially connected resistors 44 and 45 and the connections thereto constitute effectively a voltage mixer. In one illustration, the resistors 28, 30, 31 and 32 were of the order of 25,000 ohms; the resistors 34, 35, 44 and 45 were of the order of 500,000 ohms; and the effective mu of the tubes 26 and 27 was approximately unity.

In the operation of Fig. 2, let it be supposed that the voltage in the input circuit 10 comprises two portions unbalanced to ground potential and applied to the input terminals 8 and 9. Let it be further supposed that when, at a given instant, the voltage portion on the terminal 8 is $(+a)$, then voltage portion on the terminal 9 is $(-b)$. This means that, at the given instant, the voltage portions $(+a)$ and $(-b)$ are simultaneously impressed on the control grids of the respective tubes 26 and 27. Due to phase reversal of the voltage portion $(+a)$ in the tube 26, the voltage portion $(-a)$ is impressed on the voltage mixer terminal 36 from the output circuit of the tube 26, and a voltage portion $(-b)$ is directly impressed on the voltage mixer terminal 38 from the cathode of the tube 27. Due to phase reversal of the voltage portion $(-b)$ in the tube 27, the voltage portion $(+b)$ is impressed on the voltage mixer terminal 46 from the output of the tube 27, and voltage portion $(+a)$ is directly supplied to the voltage mixer terminal 48 from the cathode of the tube 26. As the mid-point 40 of the serially connected resistors 34 and 35 is connected to the control grid of the tube 17, the effective voltage value impressed on the control grid of the latter tube is $$\frac{(-a)+(-b)}{2}$$

As the mid-point 50 of the serially connected resistors 44 and 45 is extended over the lead 51 to the control grid of the tube 18, the effective voltage supplied to the control grid of the latter tube is $$\frac{(+a)+(+b)}{2}$$

Figure 2A:
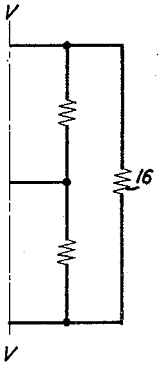
Fig. 2A is a partial diagrammatic circuit of a modification that may be substituted in Figs. 2, 4 and 7.

From the foregoing, it is evident that, at the given instant, a mean negative voltage portion balanced to ground potential is supplied to the control grid of the tube 17; and a mean positive voltage portion balanced to ground potential is impressed on the control grid of the tube 18. When, at the given instant, the voltage portions $(-a)$ and $(+b)$ are present at the respective input terminals 8 and 9, then a mean positive voltage value $$\frac{(+a)+(+b)}{2}$$

balanced to ground potential is supplied to the control grid of the tube 17, and a mean negative voltage value $$\frac{(-a)+(-b)}{2}$$

balanced to ground potential is impressed on the control grid of the tube 18. Thus, the voltage values, $$\frac{(-a)+(-b)}{2}$$

and $$\frac{(+a)+(+b)}{2}$$

considered together constitute an electrical voltage balanced to ground potential, regardless of whether the electrical voltage applied to the input terminals 8 and 9 is balanced or unbalanced to ground potential. These voltage values may comprise any frequency down to and including direct current. For the latter operation, the load 16 may be directly coupled to the output circuit of the amplifier 15 in the usual manner as illustrated in Fig. 2A. In this connection, it is understood that the circuit portion shown in Fig. 2A is to be substituted in Fig. 2 for the circuit portion shown to the right of the line V—V.

Figure 3:
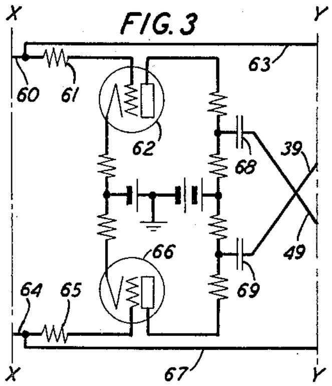
Fig. 3 is a partial diagrammatic circuit that may be substituted in Fig. 2.

Fig. 3 is a modification in which the circuit portion between the lines X—X and Y—Y is substituted in Fig. 2 for the circuit portion shown between these same lines. In Figs. 2 and 3, the input terminal 8 is extended over lead 60 and resistor 61 to the control grid of electron tube 62, and over leads 60 and 63 to the voltage mixer terminal 36; while the input terminal 9 is extended over lead 64 and resistor 65 to the control grid of electron tube 66, and over leads 64 and 67 to the voltage mixer terminal 46. The tubes 62 and 66 arranged in push-pull function to reverse the phase of the wave portions applied thereto from the input terminals 8 and 9. The effective mu of the tubes 62 and 66 is substantially unity. As the leads 39 and 49 are extended through the respective capacitors 68 and 69, the arrangement of Figs. 2 and 3 is effective down to relatively low frequencies, but however not including direct current.

In the operation of Figs. 2 and 3, let it be supposed at a given instant that the voltage portion $(+a)$ effective on the input terminal 8 is simultaneously impressed on the control grid of the tube 62 and the voltage mixer terminal 36; and that the voltage portion $(-b)$ effective on the input terminal 9 is simultaneously impressed on the control grid of the tube 66 and the voltage mixer terminal 46. Since the tubes 62 and 66, Fig. 3, function essentially as phase reverses, the tube 62 impresses voltage portion $(-a)$ over lead 49 to the voltage mixer terminal 48; and the tube 66 impresses voltage portion $(+b)$ over lead 39 to the voltage mixer terminal 38. As the voltage portions $(+a)$ and $(+b)$ are impressed at the given instant on the voltage mixer terminals 36 and 38, respectively, then the effective voltage portion $$\frac{(+a)+(+b)}{2}$$

is supplied to the control grid of the tube 17. As the voltage portions $(-a)$ and $(-b)$ are impressed at the given instant on the voltage mixer terminals 48 and 46, respectively, then the effective voltage portion $$\frac{(-a)+(-b)}{2}$$

is supplied to the control grid of the tube 18. As previously pointed out, these voltage portions constitute an electrical voltage balanced to ground potential, irrespective of whether the electrical voltage applied to the input terminals 8 and 9 is balanced or unbalanced to ground potential. As pointed out concerning Fig. 2, the opposite effect takes place when voltage portions $(-a)$ and $(+b)$ are effectively present at a given instant on the input terminals 8 and 9.

Figure 4:
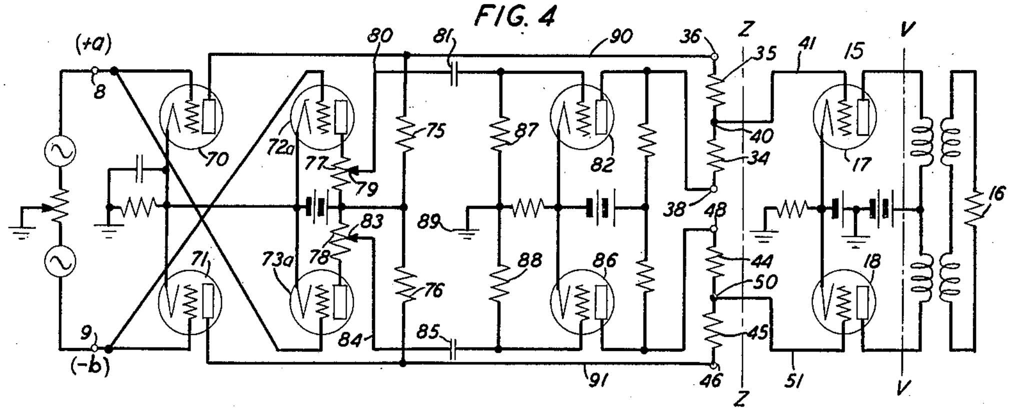
Fig. 4 is a diagrammatic circuit showing another embodiment of the invention.

In Fig. 4, the input terminal 8 is connected directly to the control grids of electron tubes 70 and 73a while the input terminal 9 is connected directly to the control grids of electron tubes 71 and 72a. The individual pairs of tubes 70 and 71 and 72a and 73a are connected so that the space current of the tubes 70 and 71 flows in anode resistors 75 and 76, respectively, and the space current of the tubes 72a and 73a flows in the anode resistors 77 and 78, respectively. The individual pairs of tubes 70 and 73a and 71 and 72a are connected to the respective terminals 8 and 9. Adjustable contact 79 engaging the anode resistor 77 associated with the tube 72a is extended over lead 80 and capacitor 81 to the control grid of electron tube 82. Adjustable contacts 83 engaging anode resistor 78 is extended over lead 84 and capacitor 85 to the control grid of electron tube 86. Leak resistors 87 and 88 are connected between the control grids of the respective tubes 82 and 86 and ground point 89.

The anode of tube 70 is applied over lead 90 to the voltage mixer terminal 36 while opposite voltage mixer terminal 38 is extended to the anode of the tube 82. The anode of tube 71 is applied over lead 91 to the voltage mixer terminal 46 while opposite voltage mixer terminal 48 is extended to the anode of the tube 86. The mid-point 40 of the serially connected resistors 34 and 35 is connected over lead 41 to the control grid of the tube 17; and the mid-point 50 of the serially connected resistors 44 and 45 is connected over lead 51 to the control grid of the tube 18.

In the operation of Fig. 4, let it be supposed that, at a given instant, voltage portion $(+a)$ effective on the input terminal 8 is simultaneously impressed on the control grids of the tubes 70 and 73a, and the voltage portion $(-b)$ effective on the input terminal 9 is simultaneously impressed on the control grids of the tubes 71 and 72a. Due to phase reversal in the tube 70, voltage portion $(-a)$ is applied to the voltage mixer terminal 36; and due to successive phase reversal in the tubes 72a and 82, voltage portion $(-b)$ is applied to the voltage mixer terminal 38. Due to phase reversal in the tube 71, voltage portion $(+b)$ is applied to the voltage mixer terminal 46; and due to successive phase reversals in tubes 73a and 86, voltage portion $(+a)$ is impressed on the voltage mixer terminal 48. As the voltage portions $(-a)$ and $(-b)$ are impressed on the voltage mixer terminals 36 and 38, respectively, at the given instant, then the effective voltage portion $$\frac{(-a)+(-b)}{2}$$

is supplied to the control grid of the tube 17. As the voltage portions $(+a)$ and $(+b)$ are impressed on the voltage mixer terminals 48 and 46, respectively, at the given instant, then the effective voltage portion $$\frac{(+a)+(+b)}{2}$$

is supplied to the control grid of the tube 18. As previously pointed out, these voltage portions constitute an electrical voltage balanced to ground potential for frequencies down to and including direct current, Fig. 2A, regardless of whether the electrical voltage applied to the input terminals 8 and 9 is balanced or unbalanced to ground potential. As previously pointed out the opposite effect takes places when voltage portions $(-a)$ and $(+b)$ are effectively present at a given instant on the input terminals 8 and 9. For direct current, the circuit portion of Fig. 2A is substituted for the circuit portion shown to the right of the line V—V in Fig. 4.

Figure 5:
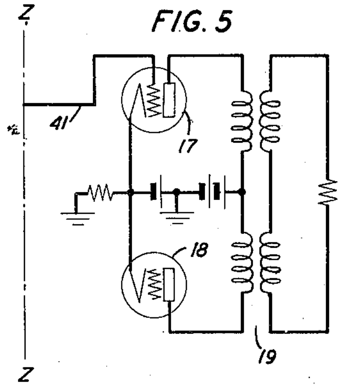
Figs. 5 and 6 are partial diagrammatic circuits of modifications that may be substituted in Figs. 2, 4 and 7.
Figure 6:
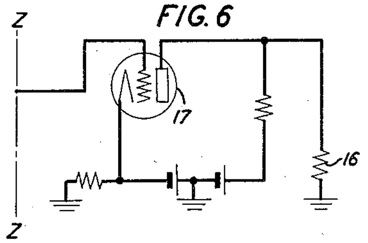

The arrangements of Figs. 1, 2, 3 and 4 may also be utilized to couple the input circuit 10 balanced or unbalanced to ground potential to a load which is unbalanced to ground potential. In this connection, it is to be understood that the circuit portion shown to the right of the line Z—Z in Fig. 5 is substituted for the circuit portion shown to the right of line Z—Z in either Fig. 2 or 4. Referring to Fig. 5, it is seen that the lead 41 is extended to the control grid of the tube 17, and the lead to the control grid of the tube 18 is interrupted which interruption in effect means that the latter control grid is ineffective. Obviously, in Fig. 5 the tube 18 may be omitted so that the load 16 is supplied entirely from the output of the tube 17 as shown in Fig. 6. In this connection it is understood that the circuit portion of Fig. 6 may be substituted for the circuit portion shown to the right of the line Z—Z in Fig. 4. In Fig. 6, it is also noted that the load 16 is directly connected to the output of the tube 17 for direct current operation.

Figure 7:
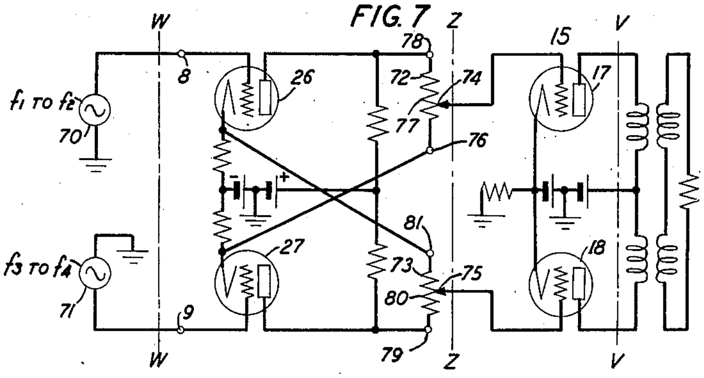
Fig. 7 is a diagrammatic circuit showing another embodiment of the invention.

Fig. 7 is generally similar to Fig. 2 except that it shows an arrangement in which the voltages to be translated originate in two different sources 70 and 71 which may be balanced or unbalanced to ground and whose frequencies extend over the ranges $f_1$ to $f_2$, and $f_3$ to $f_4$, respectively. If at a given instant, voltage $(+a)$ is applied to the control grid of the tube 26 and voltage $(+b)$ is applied to the control grid of the tube 27, then an effective voltage portion $$\frac{(-a)+(+b)}{2}$$

balanced to ground is impressed on the control grid of the tube 17 while an effective voltage portion $$\frac{(+a)+(-b)}{2}$$

balanced to ground is applied to the control grid of the tube 18. Consequently, the resultant voltage $$\left[\frac{(-a)+(+b)}{2}-\frac{(+a)+(-b)}{2}\right]$$

which is simplified to $[(+a)+(-b)]$, extending over both frequency ranges $f_1$ to $f_2$ and $f_3$ to $f_4$ is impressed on the control grids of the push-pull amplifier 15, Fig. 7, and is balanced to ground. It is noted in Fig. 7 that the potentiometers 72 and 73 are essentially the mixing resistors 34 and 35, and 44 and 45, respectively of Fig. 2 except the former embody sliders 74 and 75. It is also noted that Fig. 7 can be modified as shown in Figs. 2A, 5 and 6 and explained above regarding Fig. 2.

The potentiometers 72 and 73 in Fig. 7 serve to supply desired proportions of the effective voltages $(a)$ and $(b)$ to the control grids of the respective tubes 17 and 18 as will be presently pointed out. Thus, when the sliders 74 and 75 are actuated to the respective terminals 76 and 79, the effective voltage at the slider 74 is $(+b)$ and at the slider 75 is $(-b)$; when the sliders 74 and 75 are both actuated to the respective mid-points 77 and 80, the effective voltage at slider 74 is $$\frac{(-a)+(+b)}{2}$$

and at the slider 75 is $$\frac{(+a)+(-b)}{2}$$

and when the sliders 74 and 75 are both actuated to respective terminals 78 and 81, the effective voltage at the slider 74 is $(-a)$ and at the slider 75 is $(+a)$. At each of these three terminals, or any other terminals of the potentiometer sliders 74 and 75, the resultant voltage across both sliders as above pointed out is balanced to ground. The reverse takes place when the voltages $(-a)$ and $(-b)$ are impressed on the input terminals 8 and 9, Fig. 7.

Figure 7A:
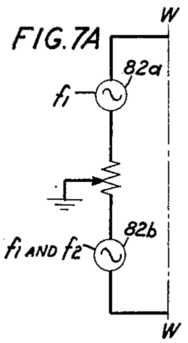
Fig. 7A is a partial diagrammatic circuit of a modification that may be substituted in Fig. 7.

Fig. 7 also serves to mix two input voltages which originate in the independent sources 70 and 71, or in related sources 82a and 82b as indicated in Fig. 7A which latter sources are essentially a duplicate of the input circuit 10, Fig. 2. In Figs. 7 and 7A the voltage components of like frequency and phase balance out while the components of different frequencies and phase appear across the sliders 74 and 75 as will be presently pointed out. Suppose, for example, that voltage $(+a)$ is of one frequency and phase, and the voltage $(+b)$ is of a different frequency and phase; and further that at a given instant voltage $(+a)$ is impressed on input terminal 8 and voltage $(+a)+(+b)$ on input terminal 9. In such case, voltage $(-a)$ is on terminal 78; voltage $(+a)+(+b)$ is on terminal 76; voltage $$\frac{(-a)+(+a)+(+b)}{2}$$

which simplifies to $$\left(\frac{+b}{2}\right)$$

is on mid-point 77; voltage $(+a)$ is on terminal 81; voltage $$\frac{(-a)+(-b)}{2}$$

is on terminal 79; voltage $$\frac{(+a)+(-a)+(-b)}{2}$$

which simplifies to $$\left(\frac{-b}{2}\right)$$

is on mid-point 80; and voltage $$\left[\left(\frac{+b}{2}\right)-\left(\frac{-b}{2}\right)\right]$$

which simplifies to $(b)$ is effective across the mid-points 77 and 80 on which the sliders 74 and 75, respectively, are positioned.

Thus, the voltages $(+a)$ and $(-a)$ of like frequency and phase balance out so that the resultant voltage $(b)$, which is only the voltage of the different frequency as above mentioned, is effective across the sliders 74 and 75. The foregoing operation involves, in effect, the differential mixing of two voltages which include common and different frequencies.

Figs. 7 and 7A also serve to mix two input voltages comprising a first voltage $(+a)$ of certain frequency $f_1$ and a second voltage $(+an)$ of the certain frequency $f_1$, where $n$ is a multiplier representing the amplitude difference between the two voltages $(+a)$ which may be balanced or unbalanced to ground. When at a given instant, voltage $(+a)$ is applied to input terminal 8 and voltage $(+an)$ to input terminal 9, then voltage $(-a)$ is on terminal 78; voltage $(+an)$ is on terminal 76; voltage $$\frac{(-a)+(+an)}{2}$$

or $$\frac{a(n-1)}{2}$$

is on the mid-point 77 and is balanced to ground; voltage $(+a)$ is on terminal 81; voltage $(-an)$ is on the terminal 79; voltage $$\frac{(+a)+(-an)}{2}$$

or $$\frac{a(1-n)}{2}$$

is on mid-point 80; and the resultant voltage $$\left[\frac{a(n-1)}{2}-\frac{a(1-n)}{2}\right]$$

or $$\frac{a}{2}[(n-1)-(1-n)]$$

or $$\frac{a}{2}(n+n-2)$$

or $a(n-1)$ is effective across the mid-points 77 and 80 on which the sliders 74 and 75, respectively, are positioned, and is balanced to ground. This resultant voltage of frequency $f_1$ comprises effectively the amplitude difference between the input voltages (a) and (an). The foregoing operation involves in effect the differential mixing of two voltages of the same frequency as to the amplitude difference therebetween.

What is claimed is:

1. A wave translating system comprising apparatus consisting of a pair of electron tubes, each including a control grid, arranged in push-pull to amplify electrical waves having portions of opposite signs and balanced to ground potential, a source to supply electrical waves having portions of opposite signs and balanced or unbalanced to ground potential, and means interposed between said amplifying apparatus and said source to change the wave portions supplied by said source into wave portions having opposite signs and balanced to ground potential and to apply said latter wave portions to the input circuit of said amplifying apparatus, said means comprising four further electron tubes arranged in pairs each of said latter tubes including a control grid, a cathode, and an anode, circuit means to connect said source to the control grids of one tube in each pair of said further tubes such that each input terminal of individual sign of said source is connected to two control grids, a pair of serially connected resistors individual to each pair of said further tubes, other circuit means to connect the anodes of one pair of said further tubes to certain terminals of said pairs of resistors, further circuit means including another pair of electron tubes to connect the output circuits of the other pair of said further tubes to other terminals of said pairs of resistors, said certain and other terminals of the individual pairs of serially connected resistors being effectively connected across said source, and additional circuit means to connect the mid-point of each pair of serially connected resistors to the control grid of one of said amplifying tubes.

2. In wave translating apparatus, a circuit for supplying signal waves comprising two portions having different polarities, a circuit for receiving signal waves, and means interposed between said supplying and receiving circuits for translating each of the two wave portions into two further wave portions and transmitting said last-mentioned wave portions to said receiving circuit, comprising a pair of electron discharge tubes each having a control electrode, a cathode, and an anode, circuit means for connecting said supply circuit to the control grids of said tubes, an impedance associated with each tube, said impedance having a resistance value that limits the flow of current therein to a negligible amount, further circuit means for connecting the cathode of each tube to the anode of the other tube and including the impedance associated with said last-mentioned tube in series therebetween whereby two further wave portions of the same sign are combined, and additional circuit means for connecting said receiving circuit to a middle point on at least one of said impedances for transmitting at least one of the respective combined wave portions to said receiving circuit.

3. In wave transferring apparatus, a source for supplying signal waves extending over a certain frequency range, a source for supplying signal waves extending over a different frequency range, a circuit for receiving both the certain and different signal waves, and means for transferring the signal waves from both said sources to said receiving circuit, comprising means including two pairs of output terminals for dividing each of the certain and different waves into two further wave portions, a pair of impedance networks, each being connected between two of said output terminals comprising one terminal of each of said two pairs thereof, each network combining two of said further wave portions to provide one resultant wave portion, said last-mentioned two further wave portions including one further wave portion divided from each of the certain and different waves, and circuit means for connecting said receiving circuit to different wave potential points on one or both of said networks whereby one or both of the resultant wave portions of varying magnitude and varying polarity are applied to said receiving circuit.

4. In a wave translating system, a circuit for supplying signal waves having a certain frequency, a circuit for supplying signal waves including the certain waves and waves having a different frequency, a circuit for receiving signal waves, and means for connecting said two supplying circuits and said receiving circuit whereby the different waves only are supplied to said receiving circuit, comprising a pair of electron discharge tubes each including a control electrode, a cathode, and an anode, circuit means for connecting each supply circuit to the control electrode of one tube, an impedance associated with each tube, other circuit means for connecting the cathode of each tube and the anode of the other tube across the terminals of one impedance whereby portions of the certain waves with opposite polarities and a portion of the different waves with a predetermined polarity are supplied to each impedance, said certain wave portions balancing out in the respective impedances and said different wave portions of predetermined polarities remaining therein, and further circuit means for connecting the receiving circuit to a preselected point of wave potential on one or both of said impedances to apply to said receiving circuit one or both of the different wave portions of the predetermined polarities.

5. In a wave translating system, a circuit for supplying signal waves of certain amplitude, a circuit for supplying signal waves of a different amplitude, a circuit for receiving signal waves, and means for applying to said receiving circuit signal waves having an amplitude which is substantially equivalent to the difference between the certain and different amplitudes, comprising a pair of electron discharge tubes each having a control electrode, a cathode, and an anode, circuit means for connecting each supply circuit to the control electrode of one tube, an impedance associated with each tube, each impedance having a resistance value that limits the flow of current therein to a negligible amount, other circuit means for connecting the cathode of each tube and the anode of the other tube across the terminals of one impedance whereby portions of the certain and different signal waves with opposite polarities are supplied to each impedance to produce a resultant wave portion having a certain polarity and an amplitude substantially equivalent to the difference between the certain and different amplitudes, and additional circuit means for connecting the receiving circuit to a middle point on at least one of said impedances for applying at least one of the resultant wave portions having the certain polarity and the difference amplitude to said receiving circuit.

6. A wave transferring apparatus according to claim 3 in which said dividing means comprises a pair of electron discharge tubes each of which includes a control electrode, a cathode, and an anode, each of said wave sources is connected to the control grid of one of said tubes, and each of said networks is connected between said two output terminals which include the anode terminal of one tube and the cathode terminal of the other tube.

7. A wave transferring system according to claim 3 in which each of said networks comprises a potentiometer including a resistor and a contact adjustable along the electrical length thereof, each of said resistors is connected between said two output terminals which comprise one terminal of each of said two pairs thereof, and said circuit means comprises circuit connections extending from said receiving circuits to one or both of said adjustable contacts.

8. In wave translating apparatus, a circuit for supplying signal waves comprising two portions having opposite signs, means for translating each of said signal wave portions into two further wave portions having opposite signs, said means including a plurality of electron devices each having a control grid, a cathode, and an anode, further means for connecting said supply circuit to the control grids of at least two of said electron devices, a plurality of output terminals, and additional means for effectively connecting the cathodes of said devices to certain output terminals and the anodes of said devices to other output terminals, a plurality of impedances each connected between one of said certain output terminals and one of said other output terminals for combining said further wave portions into two resultant wave portions having opposite signs, each of said impedances having an effective resistance that limits the amount of current flow therein to a negligible value, a receiving circuit, and another means for connecting said receiving circuit to at least one of said impedances at a point intermediate said certain and other output terminals to which the respective impedances are connected for supplying at least one of said resultant wave portions to said receiving circuit.

EVERETT T. BURTON.

REFERENCES CITED

The following references are of record in the file of this patent:

UNITED STATES PATENTS

| Number | Name | Date |
|---|---|---|
| 2,101,438 | Lindenblad | Dec. 7, 1931 |
| 2,201,345 | Percival | May 21, 1940 |
| 2,296,920 | Goodale | Sept. 29, 1942 |